INVENTOR
Robert A. Schatz

April 5, 1966  R. A. SCHATZ  3,244,938
OVERCURRENT PROTECTION APPARATUS
Filed Aug. 13, 1962  5 Sheets-Sheet 2

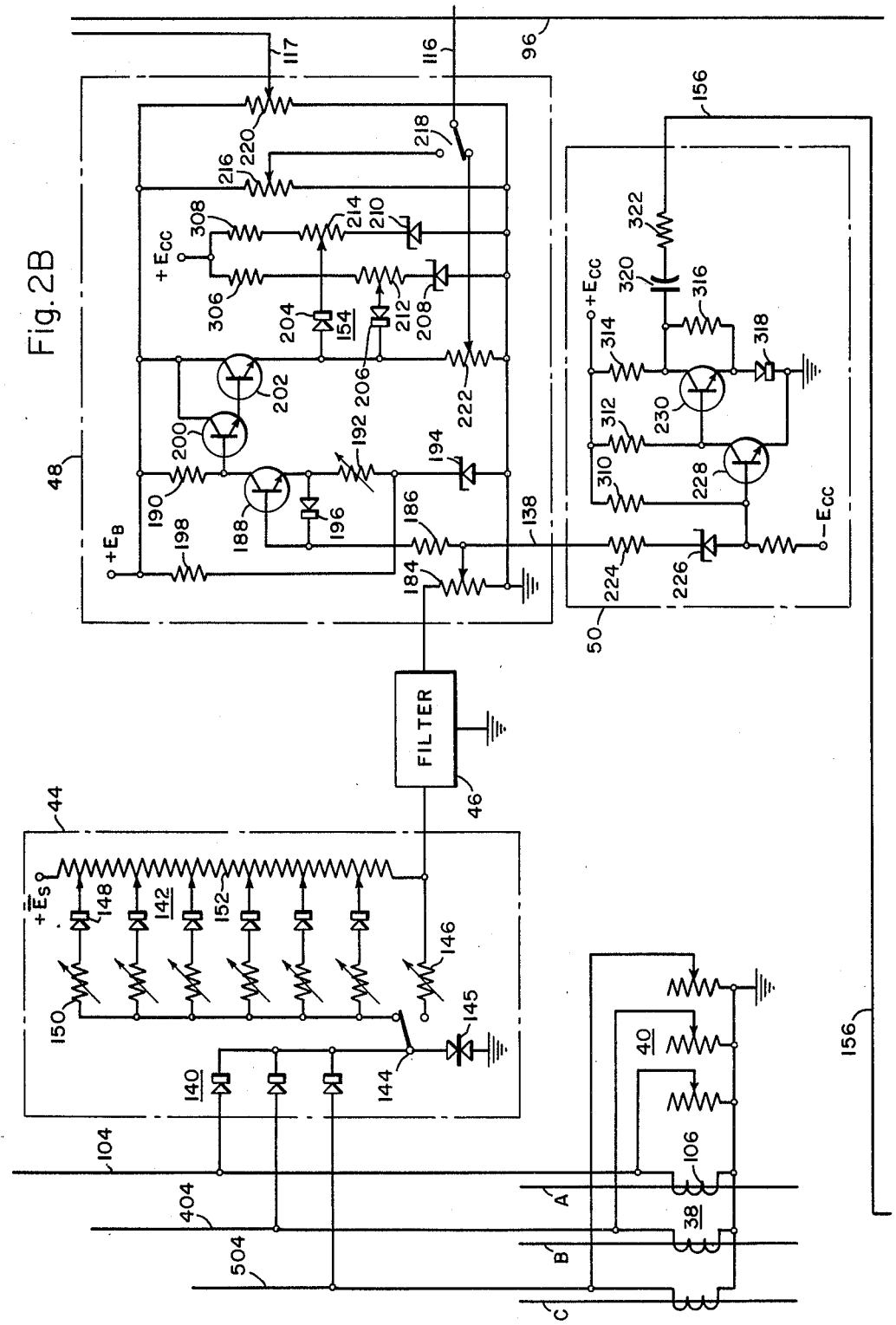

United States Patent Office 3,244,938
Patented Apr. 5, 1966

3,244,938
OVERCURRENT PROTECTION APPARATUS
Robert A. Schatz, Sharon, Pa., assignor to Westinghouse Electric Corporation, Pittsburgh, Pa., a corporation of Pennsylvania
Filed Aug. 13, 1962, Ser. No. 216,659
5 Claims. (Cl. 317—33)

This invention relates in general to electrical control apparatus, and more particularly to a system for regulating current or other electrical condition at a load.

Current regulating systems of the prior art have used such devices as tap-changing transformers, moving coil regulators, and induction regulators. These devices have disadvantages from the standpoint of reliability and ease of maintenance because of the number of moving parts and consumable arcing contacts employed.

Accordingly, it is the general object of this invention to provide a new and improved electrical control system.

It is a more particular object of this invention to provide a new and improved current regulator system which has a minimum of moving parts and arcing contacts.

Another object of this invention is to provide an overcurrent or short circuit protector of general application but which is particularly suited to protect my improved current regulator against load short circuits.

A further object is to provide a gate circuit of general application but particularly suited to my improved current regulator system.

Other objects of the invention will, in part, be obvious and will, in part, appear hereinafter.

Briefly, the present invention accomplishes the above-cited objects by providing a transformer winding connected in series between each phase of a load and the corresponding phase of a source of alternating current. Associated electrical and electronic circuits are provided to cause the transformer winding to add a voltage to the source voltage or subtract a voltage from the source voltage at the proper time in each half cycle of source voltage so that any selected root mean squared (R.M.S.) load current or other electrical condition within the range of the device is automatically maintained regardless of changes in source voltage or load. A circuit employing static components automatically switches the series transformer windings from a subtractive to an additive polarity once in each half cycle of applied voltage to maintain any root mean squared load current, power or voltage selected. For example, the load voltage may be varied between the upper limit of the line voltage plus the additive voltage of the series transformer winding and the lower limit of the line voltage minus the subtractive voltage of the series transformer winding. Short circuit protection is provided by an electronic sampling circuit which monitors the output of the regulator and disconnects the regulator from the load should an overcurrent occur at the load.

For a better understanding of the invention, reference may be had to the following detailed description taken in connection with the accompanying drawings, in which:

FIG. 2B is a schematic diagram showing the automatic control circuits used in the invention;

Figure 1:
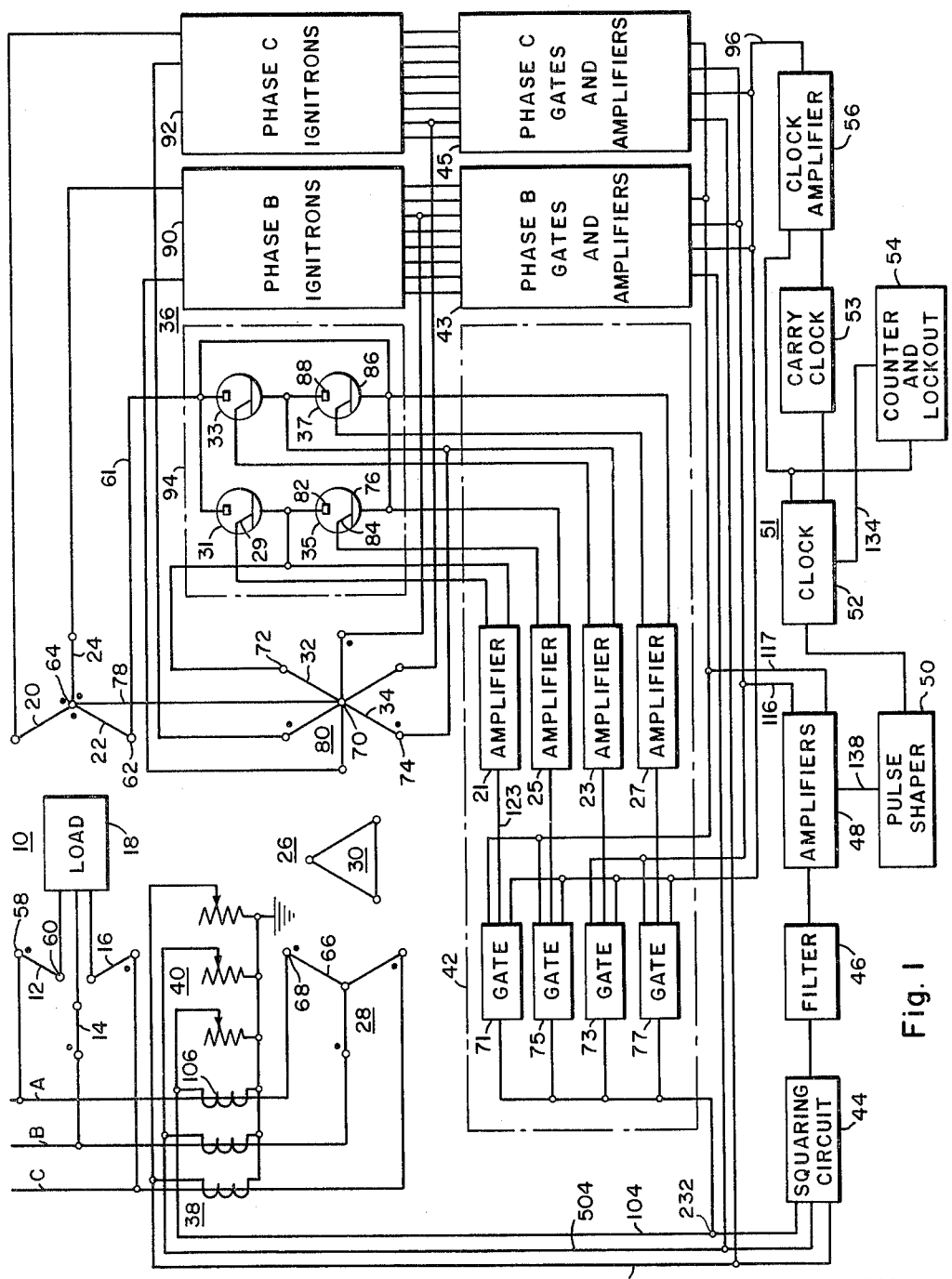
FIGURE 1 is a block diagram of the invention with parts shown schematically.

Referring now to FIG. 1 of the drawings, the preferred embodiment of the invention is shown in block form. There are illustrated three power lines A, B, and C coming from a source of three phase voltage (not shown). A three phase series connected transformer 10 having primary and secondary windings is provided, with each of the three primary windings 12, 14 and 16 being in series with a power line and an external load 18. The three secondary windings 20, 22 and 24 of the transformer 10 are connected in Y. It will be understood that three single phase transformers may be used instead of the three phase transformer 10. It will be further understood that the terms "primary" and "secondary" are used for convenience to refer to the windings of transformer 10 and do not allude to conventional transformer input and output windings. The power lines A, B and C continue on to an auxiliary transformer 26. The auxiliary transformer 26 is provided with primary or exciting windings 28, delta connected tertiary winding 30 and star connected secondary windings 80. The power lines A, B and C are connected to the primary or exciting winding 28 of the auxiliary transformer 26. The neutral 64 of the Y connected secondary windings 20, 22 and 24 of the series transformer 10 is connected to the neutral connection 70 of the star connected secondary windings 80 of the auxiliary transformer 26. The secondary windings, such as phase A secondary windings 32 and 34, of the auxiliary transformer 26 are connected to a three phase network 36 of controllable electronic switches comprising three sub-networks 90, 92 and 94. The phase A sub-network 94, for example, has four electronic switches such as ignitrons 31, 33, 35 and 37. Each phase of the switching network 36 is connected to the secondary windings of the associated phase of the series transformer 10.

Current sensors such as current transformers 38 are provided in the power lines between the series transformer 10 and the auxiliary transformer 26. The current transformers 38 serve to sense a portion of the load current and produce signals proportional to the three phase A.C. current passing to the load 18. Potentiometers 40 are associated with the current transformers 38 to allow compensation for unbalanced three phase loads. Unrectified A.C. signals are taken off the current transformers 38 via conductors 104, 404 and 504 to synchronize control circuits such as gates and associated power amplifiers 42, 43 and 45 which will be treated in detail later.

A part of the signal proportional to three phase load current is run through a squaring circuit 44 which is also a rectifier. The squaring circuit 44 has a D.C. output voltage proportional to the square of the input current at each instant. The function of the squaring circuit 44 is to obtain a signal that is more nearly proportional to the power being regulated by the device. An internal by-pass switch is provided in the squaring circuit 44 to permit optional use of the signal squaring feature. The signal from the squaring circuit 44 is passed through a low pass filter 46 to eliminate objectionable harmonics. The signal is then passed from the low pass filter 46 through voltage and current amplifiers 48. From the amplifiers 48, a portion of the amplified signal is transmitted over conductor 117 to control the six first firing gate circuits such as phase A gate circuits 71 and 75 which are associated with electronic switches such as ignitrons 31 and 35 respectively. Another portion of the amplified signal is fed through a pulse shaper 50 and into an over current protection network 51. A third portion of the amplified signal is transmitted via conductor 116 to control the six gates which fire during each half cycle of each phase so as to provide a regulated output current. In phase A, these later firing gates are gate 37 for the positive half cycle and gate 33 for the negative half cycle.

The over-current or short circuit protection network 51 consists of a short circuit clock or monostable multivibrator 52, which samples the incoming pulses for indication of load short circuits, a short circuit carry clock or second monostable multivibrator 53 which assists the clock circuit 52 in the continuous monitoring of the load circuit for short circuits; a counter with associated lockout and lockout light 54 which is provided to disconnect the current regulator from the load 18 should a persistent load overcurrent be found to exist, and a clock amplifier 56 provided to increase the power of the signal received from the clocks 52 and 53 so as to be able to turn off the gates such as the phase A gates 42 associated with the electronic switching network 36 should a short circuit condition exist at the load 18.

Phase A power amplifiers, such as 21, 23, 25 and 27, are provided in series with phase A gates 71, 73, 75 and 77 and the electronic switches 31, 33, 35 and 37, to boost the power of the signals applied to the control of the electronic switches, such as igniter 29 of ignitron switch 31.

Four electronic switches are required for each phase. Two are used to regulate the positive half cycle of load voltage and two are used to regulate the negative half cycle of load voltage in each phase of the invention.

The root mean squared current supplied to the load 18 is held to any desired value between two predetermined levels regardless of fluctuations in source voltage or load changes by causing the transformer windings 12, 14 and 16 in series with the load 18 to rapidly commutate between a line voltage opposing and a line voltage aiding condition at a predetermined time in each half cycle.

To summarize, the operation of the positive half cycle of phase A of the invention will now be discussed. Assume that phase A of the line voltage has just passed the zero point and is going positive, and that the load current from phase A through winding 12 of transformer 10 is instantaneously equal to zero. As there is no phase A load current, the potential of terminal 60 of primary winding 12 of the series transformer 10 will be equal to zero. Terminal 58 of winding 12 of transformer 10 is connected to line terminal A and hence will be at line potential, which for purposes of this example will be considered to be 100 volts positive. The phase A secondary winding 22 of transformer 10 will be 180° out of phase with the phase A primary winding 12 of transformer 10, assuming a 1:1 turns ratio, terminal 62 will be at zero potential and terminal 64 will be at 100 volts positive potential. The phase A exciting winding 66 of the auxiliary transformer 26 is also connected to the line terminal A, therefore, terminal 68 of the phase A primary winding 66 of auxiliary transformer 26 will be at 100 volts positive potential. The purpose of the auxiliary transformer 26 is to so set the voltage applied to the electronic switches that they will be utilized at their rated current and voltage. Assuming a ten-to-one voltage step down ratio, ten volts will be available between terminals 72 and 70 and between terminals 74 and 70 of the secondary windings 32 and 34 of phase A of the auxiliary transformer 26. A circuit may now be traced starting at the cathode 76 of ignitron 35, through terminal 62 of series transformer 10, through the phase A secondary winding 22 of series transformer 10, through the neutral connection 78 between the secondary winding terminal 64 of transformer 10 and the neutral terminal 70 of the secondary winding 80 of auxiliary transformer 26, through the phase A secondary winding 32 to terminal 72, and back to the anode 82 of ignitron 35. When ignitron 35 is fired, the 100 volts at terminal 58 of transformer 10 is effectively placed in series opposing with the ten volts available across winding 22 of transformer 10. This bucking connection gives a net voltage of 90 volts at terminal 60 of transformer 10. When ignitron 37 fires, ignitron 35 commutates off due to the fact that reverse current tends to flow through ignitron 35. Now the ten volts across winding 34 of transformer 26 is applied to winding 22 of transformer 10. The connection is such that the voltages are additive, hence a voltage of 110 volts is now available at terminal 60 of transformer 10. This connection is the boosting mode of interconnecting transformer 10 and transformer 26. It is to be understood that the phase A switching network 94 functions to energize the phase A secondary winding 22 of transformer 10 with a voltage which when transferred to the phase A primary winding 12 of transformer 10 first opposes and then aids the phase A line voltage during each half cycle of line voltage.

The commutating action between ignitrons 35 and 37 can be best understood by considering that the current flowing through ignitron 37 will attempt to flow through ignitron 35 to reach terminal 82. Because of the higher voltage across ignitron 37 than across ignitron 35, the current through ignitron 35 will quickly be extinguished, and the conducting path effectively commutated from the bucking winding 32 to the boosting winding 34 of the phase A secondary windings of the auxiliary transformer 26. It is to be understood that ignitrons 31 and 33 will commutate in similar fashion on the negative half cycle of phase A. The other two phase switching sub-networks 90 and 92 of the invention are identical to the aforementioned phase A switching network 94 and function in a similar manner.

It will also be understood that a transformer having a tapped secondary winding may be used rather than the aforementioned bucking and boosting arrangement. The commutation on each half cycle in such an arrangement would be between the low and the high tap of the secondary winding rather than between bucking and boosting windings.

Figure 2A:
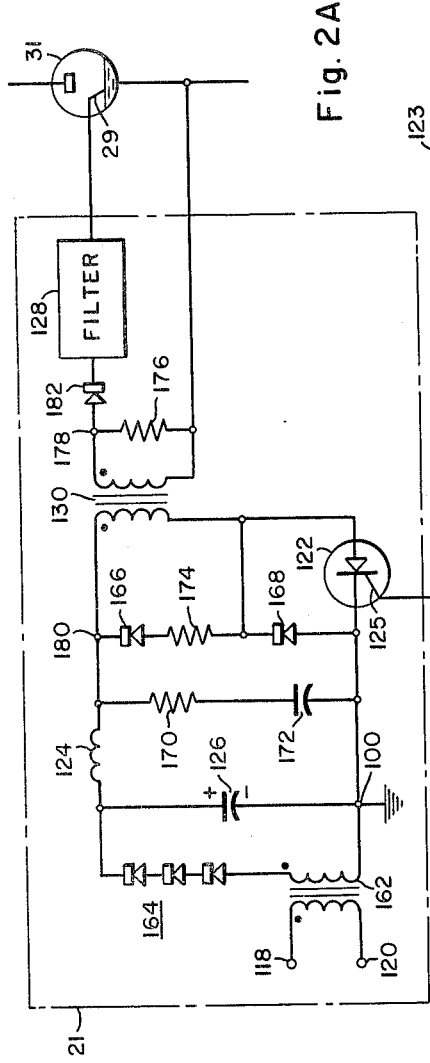
FIG. 2A is a schematic diagram illustrating one of the gate circuits and one of the power amplifiers used in the invention.
Figure 2A:
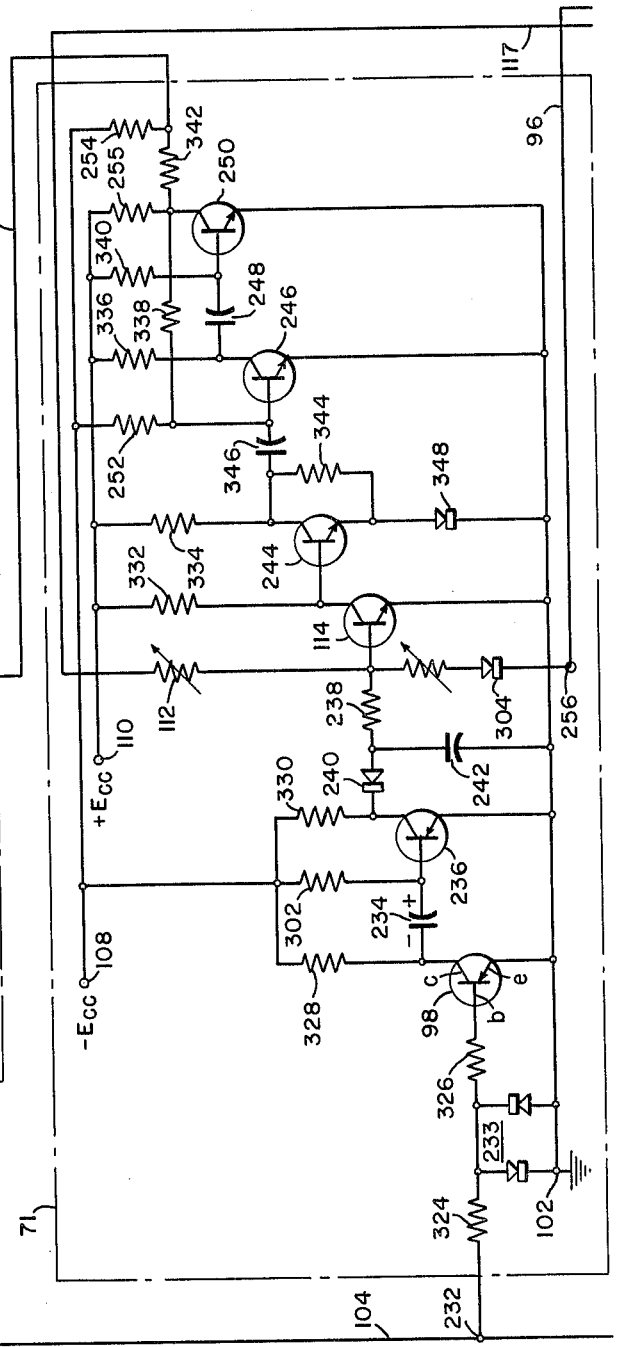

Referring to FIG. 2A, of the drawings, there is shown in detail one of the negative half cycle phase A gate circuits 71 and associated power amplifier 21 used to control the electronic switch 31. The function of these circuits is to determine the time in the negative half cycle of applied voltage that switch 31 will be gated or fired. The gate 71 will also turn off the switch 31 when the gate 71 receives the proper signal over connection 96 from a short circuit protection network 51 of FIG. 2C which will be discussed in detail later. The gate 71 is one of twelve such gates used in the invention. The gate 71 employs two PNP transistors 98 and 236 and four NPN transistors 114, 244, 246 and 250. It will be understood that the type of transistor used is not part of the invention; the choice between NPN and PNP types is determined largely by the bias voltages available. These transistors are three element devices having an emitter $e$, a collector $c$ and a base $b$ as illustrated by transistor 98. There are three inputs and one output to each of the gates. We will first consider the two inputs which are required for current regulation. The third input pertains to short circuit protection and will be discussed in reference to FIG. 2C.

The first input to be discussed is a synchronizing input 232. This input 232 puts the gate 71 in synchronism with the line current. This synchronizing input is obtained from the instrument transformers 38 of FIG. 2B which are associated with the power lines A, B and C. For example, the secondary of instrument transformer 106 is connected via a conductor 104 to input 232 of gate 71. Reversed poled diodes 233 are located at point 102 of the gate 71 to prevent a high level input signal from damaging the gate 71. Transistor 98 and transistor 236 are connected with capacitor 234 and associated resistors in a monostable multivibrator arrangement. The function of this circuit may be understood by considering that a negative going sine wave of voltage is applied at input terminal 232. Assume also that capacitor 234 has been charged to the indicated polarity by the last positive half cycle of the signal voltage. Transistor 98 will be turned on by the negative wave and transistor 236 will be turned off by the positive charge applied to base of transistor 236 by capacitor 234. To the right of the monostable multivibrator is located diode 240, capacitor 242, and resistor 238. Diode 240 is poled in a forward direction by a negative supply voltage $-E_{CC}$ applied to terminal 108. This allows capacitor 242 to charge through resistor 238 in a more or less sinusoidal manner for about one-quarter of a cycle. By this time, capacitor 234 has discharged sufficiently and is no longer able to hold transistor 236 off. Transistor 236 now goes on and is held on by resistor 302. Diode 240 is now poled so that no discharge of capacitor 242 is possible back through transistors 98 and 236. At the instant transistor 236 goes on capacitor 242 begins to discharge into the impedance to the right of the aforementioned monostable multivibrator. Depending upon the magnitude of the control bias input to the gate 71 which is applied to variable resistor 112, capacitor 242 will decay to zero in one half cycle or less. At approximately the point where the voltage across capacitor 242 crosses the zero axis an input transistor 114 is turned on thereby turning a transistor 244 off. This results in a large increase in the voltage from the collector of transistor 244 to ground. A spike of current is generated which is fed to the base of a transistor 246 turning on said transistor. A capacitor 248 which has been previously charged to approximately supply voltage couples this spike of current to a transistor 250 which is now driven considerably negative thereby turning said transistor 250 off. Now a relatively high voltage appears between the collector of transistor 250 and ground. This is the voltage that is applied to a gate terminal 125 of a silicon controlled rectifier 122 of the power amplifying circuit 21 which will be discussed later.

The second input to the gates will be applied through variable resistor 112. This input is a D.C. bias voltage and depending on the function of the gate this signal which will be referred to generally as $E_B$. For the six gates which must go on at a point of zero current or voltage the signal will be referred to $E_{BO}$. For the six gates which must come on during the half cycle the control voltage will be referred to $E_{BC}$. It is necessary to have a gate on at all times during each half cycle of applied phase voltage. As gate 71 is to trigger an electronic switch 31 which is one of the switches used in the first half of the negative going phase A half cycle the bias voltage applied to resistor 112 will be $E_{BO}$. As mentioned previously, this voltage is applied to the base of transistor 114 to determine the time of operation of the gate cycle. Resistor 112 may be varied when the invention is calibrated to ensure that the gate 71 functions at the proper time in the negative cycle of applied A.C. synchronizing voltage.

The third input to the gate 71 is applied over conductor 96 from a short circuit protection network which will be described later. This short circuit turn off voltage is applied to terminal 256 of the gate and then passes through protective diode 304 and a variable resistor to the base of transistor 114. The function of this voltage is to override the bias supplied through resistor 112 and hold the gate off completely in the event of an over-current at the load. Resistors such as 324 and 342 serve to set operating points in gate 71. Resistor 344 is a feedback resistor. Capacitor 346 is a coupling capacitor. Diode 348 permits unidirectional conduction between the emitter of transistor 244 and the emitter of transistor 114.

Referring now to the power amplifier 21 of FIG. 2A, a transformer 162 having input terminals 118 and 120 is provided as the primary source of power for this device. Assuming the polarity is as indicated by the dots on transformer 162, as the dotted end of the primary winding goes positive the dotted end of the secondary winding does likewise, and diodes 164 are poled in a forward direction. A plurality of diodes may be used because of the high voltage involved. These diodes may be shunted with a transient voltage dividing network (not shown) to ensure a proper voltage division across the diodes 164. Transient voltage dividing networks are well known in the art and are comprised of parallel resistors and capacitors. The resistors being used for steady state or direct current division of voltage across the diodes and the capacitors functioning to divide very fast waveforms equally across each diode thereby getting the maximum use of the reverse voltage strength of each diode. A capacitor 126 in parallel with the diodes 164 will begin to charge. The instantaneous voltage on the capacitor 126 will reach the peak of the secondary voltage of transformer 162 in approximately 90° to 100° after the primary voltage crosses zero and begins going positive. As the secondary voltage of transformer 162 begins to go in the negative direction while still remaining at a positive absolute value, the fully charged capacitor 126 will remain charged because the diodes 164 will be poled off. The power amplifier 21 is now charged and ready for firing, the energy being stored in capacitor 126. A half cycle is allotted for both charging and discharging of capacitor 126, but such a length of time is not fully used.

A silicon controlled rectifier 122 is the switching device in the power amplifier 21. The silicon controlled rectifier 122 is held off by a small negative bias voltage. With the polarity of the voltage across capacitor 126 as shown, diodes 166 and 168 are poled off. A series network of resistor 170 and capacitor 172 is an auxiliary network which may be used to control ringing or high frequency oscillation of the silicon controlled rectifier 122. Diode 166 and resistor 174 are provided as a discharge path across the primary of a pulse transformer 130. Connected to the secondary of the pulse transformer 130 is a damping resistor 176, a diode 182 and a low pass filter 128. Assuming that the silicon controlled rectifier 122 is turned on by the gate circuit 71, the pulse transformer 130 is thrown into the circuit. Transformer 130 is connected directly across the terminals of the series combination of capacitor 126 and coil 124. The pulse transformer 130 can be considered an inductance lumped with the inductance of coil 124 giving a net inductance. Considering damping resistor 176 to be reflected into the primary of pulse transformer 130, an effective series circuit is formed of capacitor 126, coil 124 and the damping resistor 176. This being the case, we now have a series circuit of a charged capacitor 126, an inductor 124 that has zero initial current, and a fixed resistor 176. The silicon controlled rectifier 122 is the switching element in this effective series circuit which releases the capacitor energy to the circuit in a very short time. The values of capacitance and inductance are selected to produce a series resonant circuit. The damping resistor 176 is deliberately chosen so that the above mentioned series circuit will oscillate. This oscillation is necessary so that the silicon controlled rectifier 122 will go negative for a short increment of time. Merely removing the power from the silicon controlled rectifier 122 may not be sufficient to turn it off. A sine wave of current is set up by the aforementioned series resonant circuit. This current flowing through resistor 176 results in a voltage that is sinusoidal. Due to the rectification by diode 182 a half wave of voltage is received by igniter 29 of ignitron 31. This positive half wave is of a duration of the order of 500 microseconds and its peak value will run to the order of 500 volts. After this half cycle has been accomplished the series resonant circuit generates a negative going half cycle. Diodes 166 and 168 are poled in the forward direction and silicon control rectifier 122 is poled in a reverse direction turning it off. The current which now flows as a result of this negative half cycle must choose a different path. The path available is through capacitor 126, coil 124, diodes 166 and 168, and resistor 174. Because a considerable amount of the energy stored in capacitor 126 has been used in firing the ignitron the energy available is less than during the previous half cycle. Also during this interval, the capacitor 126 which originally had dumped energy into the inductor 124 now has some of this energy returned leaving a small residual charge on capacitor 126. So therefore, the two diodes 166 and 168 have passed reverse current. Following these two half cycles, there is no current flowing in coil 124 or in diode 168. Diode 166 and resistor 174 also serve to discharge the magnetizing inductance of pulse transformer 130 at the end of the positive going half cycle. The energy stored in the magnetizing inductance of pulse transformer 130 is dissipated in resistor 174. Diode 182 is a blocking diode to prevent negative going voltages from passing current in the reverse direction to the ignitron 31 which can under certain conditions actually destroy the igniter.

A common reference point is established throughout the invention by means such as ground connections 100 and 102. D.C. potentials such as $-E_{CC}$ and $+E_{CC}$ necessary for the proper operation of the gate 71 and other parts of the invention may be supplied from a separate power supply (not shown) through terminals such as 108 and 110.

A low pass filter such as 128 may be used at the output of power amplifier circuit 21 to suppress feedback into the power amplifier 21 should the electronic switch such as ignitron 31 malfunction.

The automatic feedback control circuit for the invention is illustrated in FIG. 2B. This circuit employs a plurality of NPN transistors and associated circuitry to use a minute portion of the output of the invention to control the gates and thereby hold the output of the invention constant. The automatic feedback control circuit comprises current transformers 38 mounted on power leads A, B and C through which a portion of the load current must flow, squaring circuit 44, low pass filter 46, amplifiers 48, and pulse shaper 50. It is to be noted that current transformers 38 also supply synchronizing voltage to the gates via conductors 104, 404 and 504. Potentiometers 40 are associated with the current transformers 38 to allow compensation for unbalanced three phase loads. A portion of the output of the current transformers 38 is rectified by a three phase rectifying system 140 consisting of three diodes to provide a D.C. signal proportional to three phase load current. This D.C. signal may be fed into a squaring network 142 if it is desired to have a signal proportional to the square of load current to more nearly approximate load power. A bypass switch such as 144 may be provided to allow the choice of a squared load current signal from squaring network 142 or an average load current signal through variable resistor 146. The squaring network 142 shown comprises an array of a plurality of units consisting of series connected diodes and variable resistors such as diode 148 and resistor 150. These units are arranged substantially in parallel and associated with an external D.C. power supply $+\overline{E}_S$ applied to resistor 152. An overvoltage protector 145 may be used to prevent damage to the circuit to the right of rectifier 140. A low pass filter 46 of any suitable design may be used in the feedback control circuit to reject high frequencies which may be produced in the squaring circuit 44 and such power frequencies as may be coupled in from the three phase rectifier 140. The low pass filter 46 is needed to remove all frequencies above 60 c.p.s. because of the D.C. amplifiers that follow.

From the filter 46 the signal is passed through a rheostat 184 which sets the level of the signal for the amplification stages which are to follow. The signal is then applied to the base of transistor 188 which is a voltage amplifying device having a load resistor 190 and a variable resistor 192 which serves the dual function of feedback resistor and gain adjustment. A Zener diode 194 is used to control the output voltage of the transistor 188. A diode 196 is used to protect transistor 188 against high inverse voltages. A resistor 198 is used to ensure that a relatively constant current is passed through Zener diode 194 thereby maintaining the operating point and voltage of Zener diode 194 at a relatively constant reference value. The output of transistor 188 is connected to the base of a transistor 200. Transistor 200 and transistor 202 are connected as a Darlington pair. These transistors are connected in an emitter follower pattern. The advantage of this connection is that the input impedance is very high and the output impedance is rather low. With this circuit it is possible at very low current levels to reproduce the output voltage of transistor 188 in the emitter circuit of transistor 202. In effect, a high order of current amplification has been obtained at the expense of a slight attenuation in the D.C. voltage level. The voltage available across a potentiometer 222 is used to drive the later firing gates. A voltage clamping circuit comprising diodes 204 and 206, associated potentiometers 212 and 214 and two Zener diodes 208 and 210 is connected to the emitter of transistor 202. This circuit holds the later firing gate driving voltage to the necessary limited range. The upper and lower levels of this output voltage of amplifier 48 are adjusted by selecting the proper value of Zener diodes 208 and 210 and setting potentiometers 212 and 214. A potentiometer 220 is connected directly across the power supply $+\overline{E}_B$ and ground. The function of this potentiometer is to provide a driving voltage for the six gates which are the first firing gates for each half cycle of each phase. This voltage shown hereinafter shall be referred to as $E_{bo}$. A switch 218 is provided to bypass the automatic feature of the invention and permit manual setting of the current voltage or power level desired by means of potentiometer 216.

It will be understood that for three phase operation of the invention, six channels must be available to fire at the beginning of each half cycle whether positive or negative. Six more channels must be available to make a bucking or boosting connection at the proper time in each cycle whether positive or negative, so that the desired R.M.S. or average output current is maintained. Throughout the invention, a voltage produced by amplifier 48 will be referred to in general as $+\overline{E}_b$. The term $+E_{bo}$ is applied to the voltage that controls the gates which fire at the beginning of a cycle. The term $+E_{bc}$ refers to the voltage which controls the gate switch fired during the cycle. It is these later firing gates which give the regulating action.

Resistors 190, 306, 308, 310, 312 and 314 are used in the automatic feedback control circuit of FIG. 2B to set operating points.

Pulse shaper 50 is a device which has the same input as was applied to amplifier 48. The function of this circuit is to produce a pulse which is applied to an overcurrent protection circuit which will be described in detail later. The input to the pulse shaper 50 is through a resistor 224 and a Zener diode 226 to a switching transistor 228. An additional switching transistor 230 is provided to operate in an inverse manner to transistor 228. When one transistor is on the other transistor is off. Resistor 316 is a feedback resistor. Diode 318 permits unidirectional conduction between the emitter of transistor 230 and the emitter of transistor 228. Capacitor 320 and resistor 322 couple the pulse to an overcurrent protection network which will be considered later. The function of Zener diode 226 is to isolate the pulse shaper 50 until an overcurrent exists. The value of Zener diode 226 is so chosen to break down at the desired voltage produced by an overcurrent in lines A, B and C. This voltage progagates through squaring circuit 44 and filter 46 to pulse shaper 50. When Zener diode 226 is triggered a relatively high voltage is produced between the collector of transistor 230 and ground. This spike of voltage is applied via conductor 156 to an overcircuit protection network 51 of FIG. 2C which will now be considered.

Figure 2C:
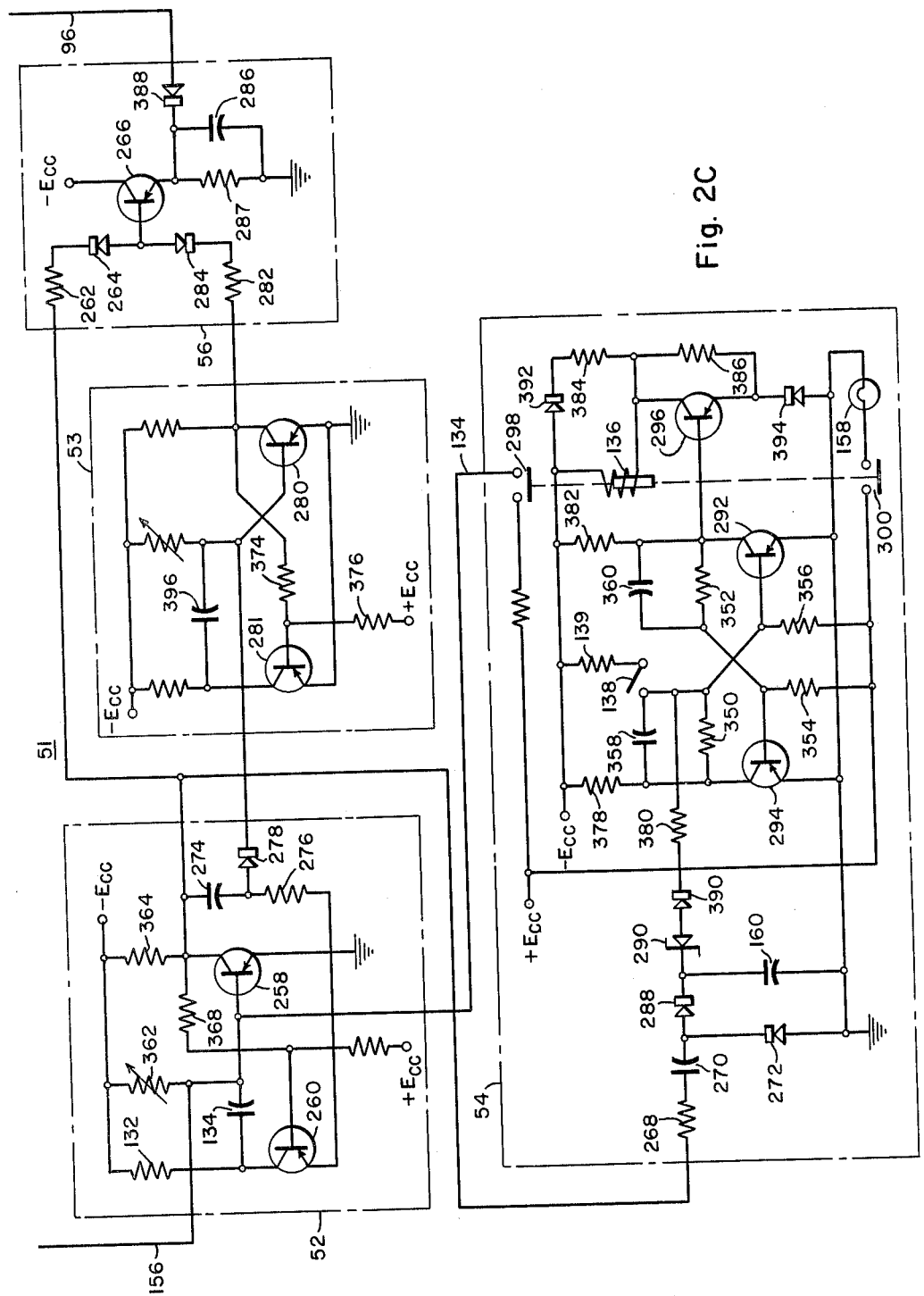
FIG. 2C is a schematic diagram of the circuits used for over-current or short circuit protection of the invention.

Referring to FIG. 2C there is shown the overcurrent protection network 51. This network is composed of a short circuit clock 52, a short circuit carry clock 53, a clock amplifier 56 and a combination counter and lockout 54.

By the term "clock" it will be understood that a monostable multivibrator is referred to. Two clocks are used because of the difficulty in obtaining reliable monostable multivibrators which have a long period of on time and a very short period of reset time. The two clocks are substantially the same and the burden of holding the gates off is periodically transferred from one clock to the other. The negative output voltages from the clocks may be seen at FIG. 4. The clock amplifier 56 increases the power level of the signals from the clocks sufficiently to drive off all the gates. One complete cycle of operation is comprised of the on period of the short circuit clock 52 followed immediately by the on period of the carry clock 53. This is best illustrated by reference to FIG. 4. Each time one of these cycles is completed, a charge is stored in capacitor 160 of the combination counter and lockout 54. The function of the counter and lockout 54 is to literally count how many times the clocks have detected an overcurrent condition. When the clocks have cycled three times, the level of the voltage stored in capacitor 160 is just below the firing voltage of the amplifier comprising transistors 292 and 294. As soon as the carry clock attempts to complete its fourth cycle there is enough voltage supplied to capacitor 160 to trigger the amplifier comprising transistor 292 and 294. This amplifier is also constructed in a monostable multivibrator configuration to provide memory so that the counter 54 stays in the locked out condition until manually reset. An amplifying transistor 296 is provided to energize a relay 136. This relay is provided to hold the short circuit clock 52 on despite the fact that the short circuit clock 52 may not now be getting an overcurrent signal input. This is a positive lockout feature which prevents excessive cycling of the clocks in the event of persistent intermittent overcurrents.

The short circuit clock 52 is provided with transistors 258 and 260 connected as a monostable multivibrator. When the short circuit clock 52 receives an input from the pulse shaper 50 over conductor 156, a relatively high voltage is produced at the collector of transistor 258. This voltage is applied to the base of transistor 266 of the clock amplifier 56 by means of a resistor 262 and a diode 264. This biases transistor 266 on and provides an output voltage across capacitor 286 and resistor 287 of considerable magnitude. This output voltage is applied by means of conductor 96 to phase A gate 71, immediately turning it off. The same voltage is simultaneously applied to all the other gates.

The voltage across transistor 258 is also applied to the counter 54 by means of resistor 268 and capacitor 270. Capacitor 270 is rapidly charged to the output voltage of transistor 258. The output voltage of transistor 258 also causes capacitor 274 of the clock 52 to charge. After the short circuit clock 52 relaxes back to its original state, capacitor 274 discharges through a resistor 276, developing a large voltage of such a polarity as to pole a diode 278 in the forward direction. This passes a large positive voltage to the base of transistor 280 of the carry clock 53. The internal timing cycle of the monostable multivibrator of the carry clock comprising transistors 280 and 281 and associated circuitry is now set into motion. The large voltage at the collector of transistor 280 is coupled through resistor 282 and diode 284 into the base of clock amplifier transistor 266. The output of the clock amplifier 56 again causes all the gates to be driven off. A capacitor 286 functions to furnish carry over if there should be a short interval in which one clock is off and the other clock is not yet on. As the voltage across transistor 258 collapses to zero, the charge on capacitor 270 of counter 54 causes current to flow through diode 288 to capacitor 160 causing capacitor 160 to charge to a voltage which is proportional to the original charge on capacitor 270. It will be understood that capacitor 160 is the integrating or counting element of the counter 54. Zener diode 290 is of such a value as to prevent any of the circuitry to the right of such Zener diode being energized by the individual short circuit pulses. After the internally controlled period of the carry clock 53 has expired this clock will reset with transistor 280 now going on. If the short circuit has disappeared in this interval there will be no further output from any of the clocks. However, assuming that a short circuit still exists, as soon as the short circuit carry clock 53 has reset and released all the gates to their normal mode of operation the current sensing means of FIG. 2B will detect the overcurrent condition and produce a large voltage across potentiometer 184 of FIG. 2B. This voltage will be coupled through pulse shaper 50 to the short circuit clock 52 where the same cycle of operation that has just been described will repeat. Now, the second pulse of voltage will be added to the voltage previously applied to capacitor 160 giving a net of two units of charge on capactor 160. The voltage across capacitor 160 is still somewhat less than ⅔ of the voltage applied to capacitor 270. Thus, it is seen that the counter 54 is counting and remembering the number of times a short circuit or overcurrent to the load has ben detected. During the time the short circuit clock 52 or the carry clock 53 is in operation the gates such as phase A gate 71 are all biased off.

Assuming now that this second cycle of operation has been completed and the carry clock 53 has gone off releasing the gates to the line and an overcurrent condition is still present. Once more the short circuit clock 52 is energized and the clocking and counting cycle repeated. Another unit of charge is coupled from capacitor 270 to capacitor 160 and added to the two originally there. The voltage at capacitor 160 is now just under the triggering level of Zener diode 290. Assuming now that the third cycle of operation of both clocks is completed and the gates such as phase A gate 71 released to normal operation, if an overcurrent is still present the clocks now again trigger. When the short circuit clock 52 attempts to transfer the hold off function to the carry clock 53 a fourth unit of charge is transferred from capacitor 270 to capacitor 160. This fourth unit of charge is sufficient to raise the voltage level of capacitor 160 above the triggering level of Zener diode 290. Now a positive voltage is coupled to the base of a transistor 292 thereby turning it off and turning a companion transistor 294 on. These two transistors are so connected with resistors 350, 352, 354 and 356 as well as capacitors 358 and 360 so as to function as a monostable multivibrator. A transistor amplifier 296 is now driven on, energizing a relay 136. When relay 136 is energized, contacts 298 and 300 close. A light 158 is now energized indicating to operating personnel that the invention has been locked out. The base of transistor 258 is now connected to a positive supply $+E_{cc}$ which holds this transistor on indefinitely. Transistor 260 is held off indefinitely by transistor 258. Thus, there is a locking down of the short circuit clock 52 and all twelve gates are held permanently off. A reset button 138 and associated resistor 139 are provided in the counter 54 to reenergize the invention when the overcurrent has been removed. The reset button when pressed, causes the base of transistor 292 to become negative turning on this transistor. Transistor 292 in turn drives transistor 294 off deenergizing relay 136 and opening the lock down contacts 298 and 300.

It will be understood that resistors 362 through 386 are used to establish operating points for the eight PNP transistors used in the overcurrent protection network 51. Diodes 388, 390, 392 and 394 are used in the same network to provide undirectional conduction. Capacitor 396 in the carry clock 53 serves as a part of an RC timing circuit; capacitor 134 serves the same function in the clock 52.

The overcurrent protection network 51 has been shown to override the regulating action of the invention and protect the invention by removing the invention from the line in the event of load overcurrent of predetermined severity and duration.

It will be further understood that all circuits of the invention are supplied with D.C. operating potentials such as $+E_b$, $+E_{cc}$ and $-E_{cc}$ from a separate voltage supply (not shown).

Figure 4:
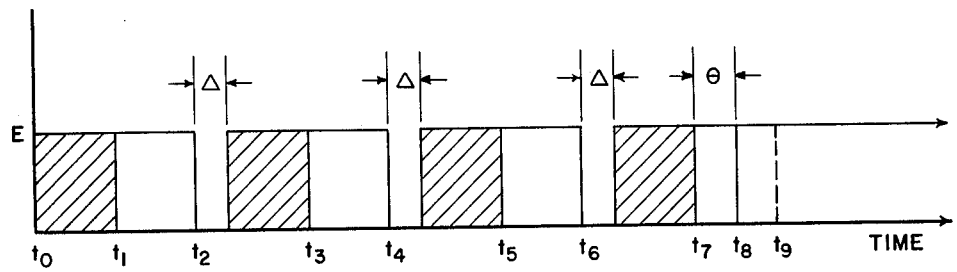
FIG. 4 is a graph of the pulses applied to the counter in the over-current or short circuit protection network of FIG. 2C.

Referring to FIG. 4 there is illustrated the train of pulses applied to the counter and lockout circuit 54 by the short circuit clock 52 and short circuit carry clock 53 of FIG. 2C. The first complete pulse is shown between $t_0$ and $t_2$. The shaded portions of the pulses as between $t_0$ and $t_1$ are supplied by the short circuit clock 52. The unshaded portions of the pulses, as between $t_1$ and $t_2$ are supplied by the short circuit carry clock 53. From $t_0$ to $t_1$ the short circuit clock 52 is firing and the short circuit carry clock 53 is quiescent. From $t_1$ to $t_2$ the short circuit carry clock 53 is firing and the short circuit clock 52 is recovering. The interval Δ is the time during which the invention is released to the line, again senses an overcurrent and produces another short circuit pulse. The interval $\theta$ is the time after the short circuit clock 52 goes off for the fourth time until the lockout relay 136 is energized. During this interval the carry clock 53 provides output. With the end of the interval $\theta$, from $t_8$ onward, the short circuit clock 52 is locked on until the momentary reset switch 138 is pressed. The carry clock 53 goes off at $t_9$, but the clock amplifier 56 is now energized by the short circuit clock 52. At time $t_8$ the predetermined number of pulses have been received in an integrating device in the counter and lockout circuit 54 such as a capacitor 160, the lockout relay 136 will be energized closing contacts 298 and 300 and turning off all the gates such as phase A gate 71, effectively removing the current regulator from the load 18.

Figure 3:
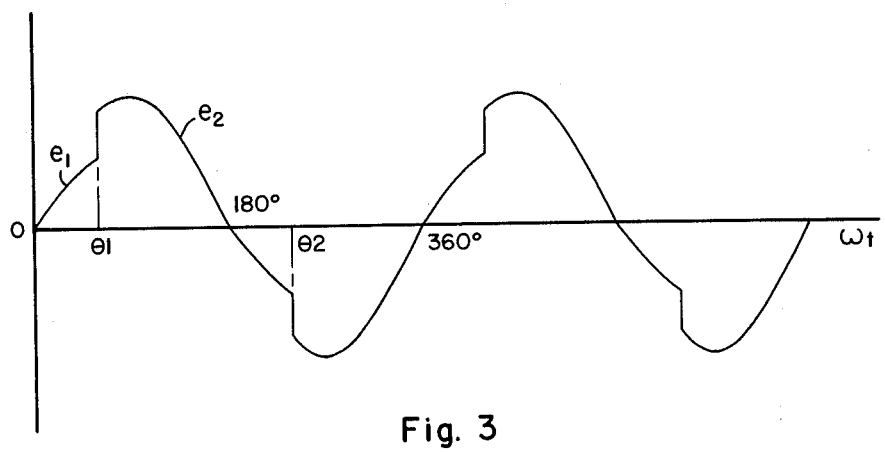
FIG. 3 shows a graph of a typical voltage output waveform produced by one phase of the invention.

In FIG. 3 of the drawings is shown a typical output voltage waveform produced by one phase of the invention. It will be understood that while but one phase is shown, the other phases will have an identical waveshape. The first positive half cycle is shown between zero and 180° on the $\omega t$ axis. At an angle $\theta_1$ which is controlled by the previously discussed gate circuits such as gate 71 of FIG. 2A the voltage applied to the load commutates almost instantaneously between the voltage $e_1$ and a higher voltage $e_2$. On the negative half cycle between 180° and 360° the voltage applied to the load by phase A again commutates between $e_1$ and $e_2$ at an angle $\theta_2$ which is the same distance from the 180° point of the voltage wave as the angle $\theta_1$ is from the zero point of the voltage wave. These firing angles $\theta_1$ and $\theta_2$ are advanced or retarded in unison by the gate circuits such as gate 71 of FIG. 2A in response to signals from the automatic feedback control circuit of FIG. 2B so as to produce an output voltage that has an R.M.S. value of any desired level between the limits of $e_1$ and $e_2$.

It will be noted that the output voltage is not a sine wave, however, in practice it has been found that the form factor of the wave produced by the invention is entirely satisfactory for the operation of power circuits such as rectifiers or electrical furnaces.

It will, therefore, be apparent that there has been disclosed a current regulator which functions with a minimum of moving parts and is completely self-protecting against short circuits in the load served.

Since numerous changes may be made in the above-described apparatus and different embodiments may be made without departing from the spirit thereof, it is intended that all the matter contained in the foregoing description or shown in the accompanying drawings shall be interpreted as illustrative and not in a limiting sense.

What is claimed is:
1. An overcurrent protection network comprising:
   first means associataed with a device to be protected from excessive current for providing a first signal responsive to the current magnitude;
   second means connected in circuit relation with said first means to produce a pulsed second signal when current in the device to be protected exceeds a predetermined magnitude;
   monostable multivibrator timing means connected in circuit relation with said second means;
   said monostable multivibrator timing means including first and second clocks;
   the first of said clocks having an input connected to said second means;
   the other of said clocks being connected in series with the first clock so that one clock is on while the other clock is resetting;
   both of said clocks providing output signals which are connected to turn off the protected device for a predetermined period when said second means senses an overcurrent and provides a pulsed second signal;
   capacitor counting means connected to said monostable multivibrator means to store a predetermined number of output signals from said monostable multivibrator means in the form of electrical charges;
   lockout means connected in circuit relation with said capacitor counting means and said monostable multivibrator means to prevent the clocks from cycling when a predetermined number of pulses have been received by the capacitor counting means from said monostable multivibrator means;
   and reset means connected in circuit relation with said lockout means for placing said monostable multivibrator means back in operation.

2. An electric circuit for providing spaced output signals when a predetermined electrical quantity exceeds a predetermined magnitude and a continuous output signal when a predetermined number of the spaced output signals have been produced in a predetermined period of time, comprising:
   first means for providing a first signal responsive to the magnitude of the predetermined electrical quantity,
   second means connected in circuit relation with said first means for providing a second signal when said first signal exceeds a predetermined magnitude,
   third means connected in circuit relation with said second means for providing an output signal having a predetermined duration when said second means produces said second signal,
   said third means providing an additional output signal having said predetermined fixed duration after a predetermined interval, each time said first signal exceeds the predetermined magnitude at the end of an output signal,
   fourth means connected in circuit relation with said third means for counting said output signals,
   said fourth means providing a third signal after counting a predetermined number of said output signals,
   said third signal being applied to said third means to provide the continuous output signal.

3. An electric circuit for providing output signals when a predetermined electrical quantity exceeds a predetermined magnitude comprising:
   first means for providing a first signal responsive to the magnitude of the predetermined electrical quantity,
   second means connected in circuit relation with said first means for providing a pulsed second signal when said first signal exceeds a predetermined magnitude,
   third means connected in circuit relation with said second means for providing an output signal having a predetermined duration in respose to said pulsed second signal,
   said second means providing a pulsed second signal a predetermined interval of time after the termination of each output signal when the first signal exceeds the predetermined magnitude at the termination of an output signal, fourth means connected in circuit relation with said third means for counting said output signals, said fourth means providing a third signal after counting a predetermined number of output signals which is applied to said third means, said third means providing a continuous output signal in response to said third signal.

4. An overcurrent protector for electrical apparatus comprising first means for providing a first signal responsive to the current magnitude in the apparatus to be protected, second means connected in circuit relation with said first means for producing a pulsed second signal when said first signal exceds a predetermined magnitude, multivibrator means connected in circuit relation with said second means for providing an output signal having a predetermined duration in response to said pulsed second signal, said second means providing a pulsed second signal a predetermined period of time after the termination of each output signal when the first signal exceeds the predetermined magnitude at the termination of an output signal, counting means connected in circuit relation with said multivibrator means for counting said output signals, said counting means providing a third signal after counting a predetermined number of output signals which is applied to said multivibrator means, said multivibrator means providing a continuous output signal in response to said third signal.

5. An overcurrent protector for electrical apparatus comprising current transformer means for providing a first signal responsive to the magnitude of current in the electrical apparatus, rectifier means connected in circuit relation with said current transformer means for providing a unidirectional second signal responsive to said first signal, sensing means for providing a pulsed third signal when said second signal exceeds a predetermined magnitude, multivibrator means connected in circuit relation with said sensing means, said multivibrator means providing an output signal having a predetermined duration in response to said pulsed third signal, said sensing means providing a pulsed third signal a predetermined period of time after the termination of each output signal when the second signal exceeds the predetermined magnitude at the termination of an output signal, counting means connected in circuit relation with said multivibrator means for counting said output signals, said counting means providing a continuous fourth signal after counting a predetermined number of output signals which is applied to said multivibrator means, said fourth signal overriding said pulsed third signal to cause said multivibrator means to provide a continuous output signal.

References Cited by the Examiner
UNITED STATES PATENTS

| | | | |
|---|---|---|---|
| 2,841,746 | 7/1958 | Mawhinney | 317—33 |
| 2,875,382 | 2/1959 | Sandin et al. | 317—36 |
| 2,953,695 | 9/1960 | Rywak | 307—88.5 |
| 2,957,109 | 10/1960 | White et al. | 317—41 |
| 2,959,689 | 11/1960 | Gilbert | 307—88.5 |
| 2,994,030 | 7/1961 | Diebold | 323—45 |
| 3,018,416 | 1/1962 | Karlicek et al. | 317—36 |
| 3,018,431 | 1/1962 | Goldstein | 323—45 |
| 3,060,348 | 10/1962 | Todd | 317—33 |
| 3,105,920 | 10/1963 | Dewey | 317—36 |
| 3,147,400 | 9/1964 | McClay | 317—22 |
| 3,115,879 | 11/1964 | Casey et al. | 317—32 |

LLOYD McCOLLUM, *Primary Examiner.*

J. M. THOMSON, W. E. RAY, *Assistant Examiners.*